US006848057B2

(12) United States Patent
Hicok

(10) Patent No.: US 6,848,057 B2
(45) Date of Patent: Jan. 25, 2005

(54) METHOD AND APPARATUS FOR PROVIDING A DECOUPLED POWER MANAGEMENT STATE

(75) Inventor: Gary D. Hicok, Mesa, AZ (US)

(73) Assignee: nVidia Corporation, Santa Clara, CA (US)

( * ) Notice: Subject to any disclaimer, the term of this patent is extended or adjusted under 35 U.S.C. 154(b) by 6 days.

(21) Appl. No.: 10/156,706

(22) Filed: May 28, 2002

(65) Prior Publication Data

US 2003/0226043 A1 Dec. 4, 2003

(51) Int. Cl.[7] ................................................ G06F 1/32
(52) U.S. Cl. ...................... 713/320; 713/322; 713/323
(58) Field of Search ................................ 713/300, 310, 713/320, 322, 324

(56) References Cited

U.S. PATENT DOCUMENTS

| | | | | |
|---|---|---|---|---|
| 5,919,264 A | * | 7/1999 | Reneris ........................ 713/324 |
| 6,092,209 A | * | 7/2000 | Holzhammer et al. ....... 713/324 |
| 6,122,748 A | * | 9/2000 | Hobson ........................ 713/323 |
| 6,131,166 A | | 10/2000 | Wong-Insley ............... 713/300 |
| 6,360,327 B1 | * | 3/2002 | Hobson ........................ 713/300 |
| 6,681,336 B1 | * | 1/2004 | Nakazato et al. ............ 713/322 |

FOREIGN PATENT DOCUMENTS

| | | | | |
|---|---|---|---|---|
| JP | 11085335 A | * | 3/1999 | ............. G06F/1/32 |
| WO | | I SR | 8/2003 | |

OTHER PUBLICATIONS

"Method for Orderly Computer Device Power Transitioning", Research Disclosure, Jun. 1, 1999, UK, vol. 42.*
Copy of PCT International Search Report dated Aug. 26, 2003 for corresponding PCT application, PCT/US03/16521.

* cited by examiner

Primary Examiner—Rehana Perveen
Assistant Examiner—Paul Yanchus, III
(74) Attorney, Agent, or Firm—Moser, Patterson & Sheridan LLP

(57) ABSTRACT

A novel method and apparatus for providing a decoupled power management state. The present invention decouples the operating system's perspective of the power management state from that of the actual hardware state of a host resource. Namely, the resources of a host computer can still operate and provide functionality while the host operating system is "off", while still providing power saving to the host system and user.

48 Claims, 2 Drawing Sheets

METHOD AND APPARATUS FOR PROVIDING A DECOUPLED POWER MANAGEMENT STATE

The present invention relates to a novel system for providing a decoupled power management state. More specifically, the present invention provides a system, e.g., a computer system or network, with one or more alternate power management states that allow resources of a host system to remain operational while the operating system (OS) is in a sleep mode or state.

BACKGROUND OF THE DISCLOSURE

Currently, computer systems or networks are designed to provide power management functions. Namely, as computer systems or networks continue to proliferate in commercial and residential settings, it has been observed that many of these computer systems or networks are often idle, i.e., waiting for instructions from a user or other devices. To reduce the consumption of energy, power management functions are provided so that a user can define a parameter, e.g., a time duration, where a computer system will enter a power management state or sleep mode to conserve energy.

To address this issue, the Advanced Configuration Power Interface (ACPI) specification was developed to establish industry common interfaces that allow operating system-directed configuration and power management. One goal of ACPI is to unify power management in the operating system of the computer, thereby allowing inexpensive power managed hardware to support very elaborate power management policies.

Although centralizing power management in the OS may provide some advantages, it also creates disadvantages as computing devices are increasingly deployed in a network environment, especially where real-time responses are prized. For example, computers in a home environment can be networked in such a manner that resources in each computer can be shared, e.g., a host computer having a large storage device having a plurality of stored video and/or streams or a host computer having a DVD drive. To access the stored video and/or streams or the DVD drive, a remote computer must communicate its request to the OS of the host computer. Unfortunately, if the host computer has been turned "on" for some time, the power management functions of the OS would likely have placed the system in a power saving state. In order to service the request of the remote computer, the host computer must be revived or awaken to an operating state which may require a substantial amount of time.

Therefore, a need exists for a novel decoupled power management approach that provides a computer system or network, with one or more alternate power management states that allow resources of a host system to remain operational while the operating system (OS) is in a sleep mode or state.

SUMMARY OF THE INVENTION

The present invention is a novel method and apparatus for providing a decoupled power management state. More specifically, the present invention decouples the operating system's perspective of the power management state from that of the actual hardware state of a host resource. Namely, the resources of a host computer can still operate and provide functionality while the host operating system is "off", while still providing power saving to the host system and user.

The general function of the operating system is to interface the user to the host resources for general applications. However, there are specific applications where the host resources can service the user or other external clients (e.g., networked operations) without the involvement of operating system (e.g., playing a CD or a DVD).

In one embodiment of the present invention, decoupled power management is accomplished through BIOS intervention when entering and exiting power management (PM) states by allowing the BIOS to be called where states are saved/restored without interference from the OS. Under this approach, real-time state management and control of peripherals of the host computer can be realized even though the system may be in a temporary "off" state. Having to wait for the operating system to boot or a state to be restored will defeat most applications that require real-time responses.

Furthermore, with new power supply technology and new CPU voltage/frequency technology, the system fans of computing systems may not be required to be operated for executing these small tasks in an infrequent manner. Additionally, typical hardware monitoring methods can be employed to ensure that the system does not put itself at risk. This novel approach provides the user with the appearance of an "off" system and the associated power savings, while at the same time, extending the usefulness of the host computer by maintaining its resources in a ready state. This novel method can be applied to a number of different applications, whereas the above networking environment is only provided as an illustrative example.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
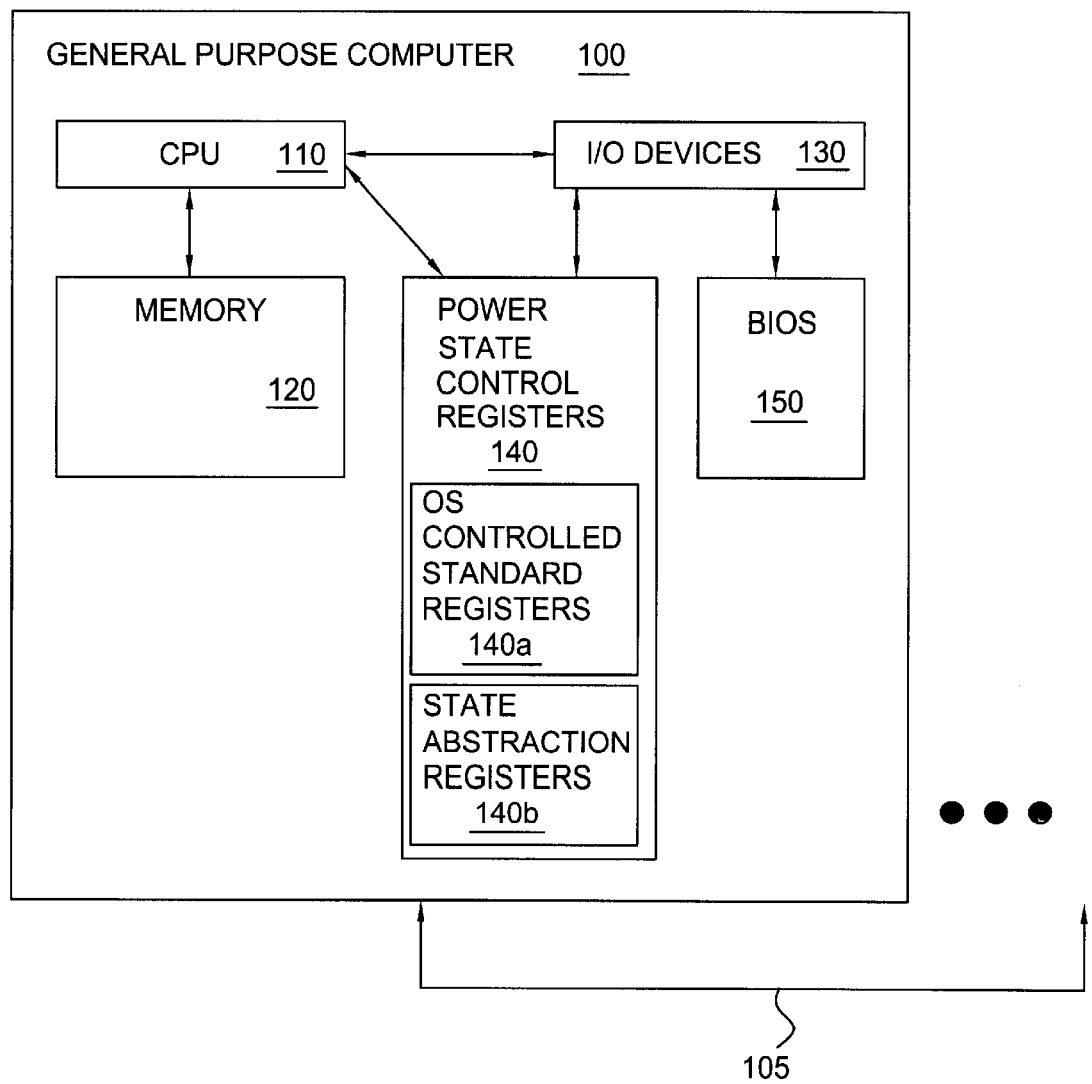
FIG. 1 illustrates a block diagram of a system for providing a decoupled power management state of the present invention.

FIG. 1 illustrates a block diagram of a system 100 for providing a decoupled power management state of the present invention. Specifically, FIG. 1 illustrates a system 100 of the present invention as implemented using a general purpose computer. The computer system 100 comprises a processor (CPU) 110, a memory 120, e.g., random access memory (RAM) and/or read only memory (ROM), a plurality of power state control registers 140, various input/output devices 130, (e.g., storage devices, including but not limited to, a tape drive, a floppy drive, a hard disk drive, a compact disk (CD) drive or a digital videodisk (DVD) drive, a receiver, a transmitter, a speaker, a display, a speech signal input device, e.g., a microphone, a keyboard, a keypad, a mouse, an A/D converter, and the like) and a basic input/output system (BIOS) 150.

In brief, data and instruction stored within the power state control registers 140 are used to provide decoupled power management to the computer system 100. It should be understood that the power state control registers 140 can be implemented as one or more physical devices (e.g., registers) that are coupled to the CPU 110 through a communication channel. Alternatively, the power state control registers 140 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 120 of the computer. Alternatively, the power state control registers 140 can be represented by Field Programmable Gate Arrays (FPGA) having control bits. As such, the power state control registers 140 (including associated methods and data structures) of the present invention can be stored on a computer readable medium, e.g., RAM memory, magnetic or optical drive or diskette and the like.

More specifically, power state control registers 140 comprise OS controlled standard registers 140a (e.g., standard ACPI registers) and power state abstraction registers 140b of the present invention. Namely, the OS controlled standard registers 140a can be ACPI status/enable registers that form the event model for power management. In contrast, the state abstraction registers 140b are used in the present invention to abstract the state(s) stored in the standard registers to another system or device defined state.

The BIOS 150 can be perceived as built-in software that determines what a computer can do without accessing programs from a disk. On personal computers, the BIOS contains all the code required to control I/O devices, e.g., the keyboard, display screen, disk drives, serial communications, and a number of miscellaneous functions. The BIOS is typically deployed as a ROM chip that resides within the computer (e.g., known as a ROM BIOS). This ensures that the BIOS will always be available and will not be damaged by disk failures. It also ensures that it is possible for a computer to boot itself. However, in the present invention, the BIOS 150 in conjunction with the power state control registers 140 provide a decoupled power management approach that is described in detail below.

Additionally, host system 100 can be deployed in a network. As such, host system 100 may receive requests from external clients on path 105 to access its resources.

Figure 2:
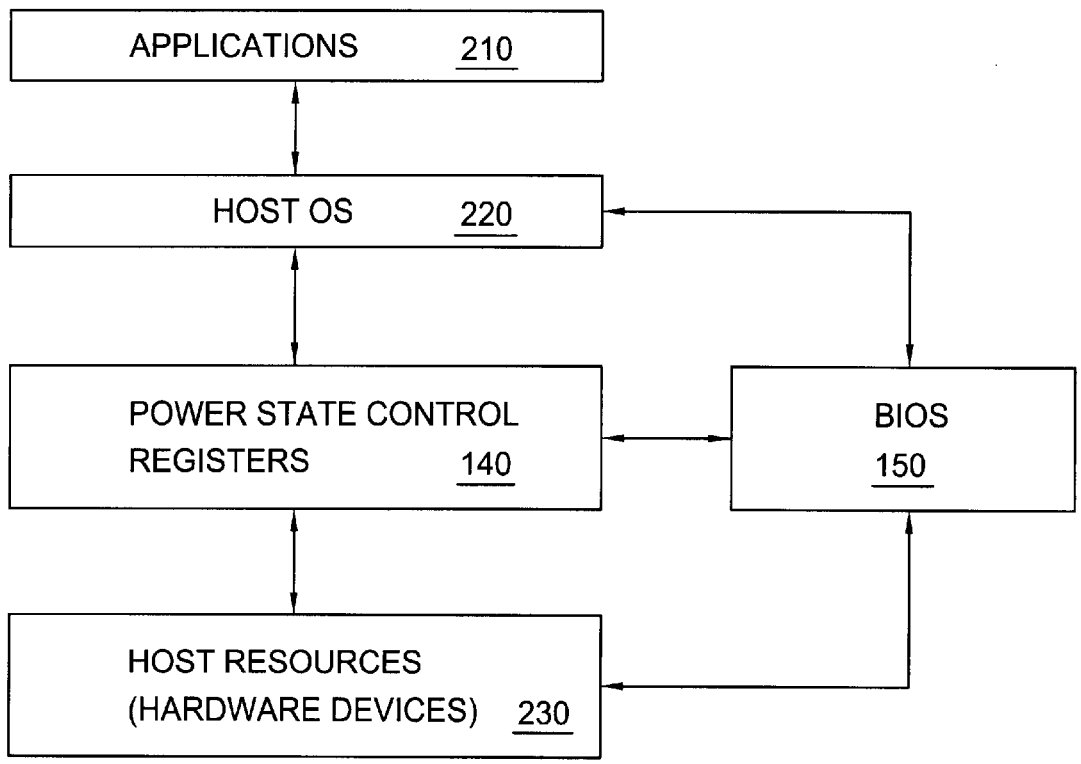
FIG. 2 illustrates a block diagram of the relationship between software and hardware components of a system for providing a decoupled power management state.

FIG. 2 illustrates a block diagram of the relationship between software and hardware components of computer system 100 for providing a decoupled power management state. Typically, software applications 210 communicate with host resources via host operating system 220. When power management functions are desired, the host OS 220 will direct the system to enter into a power management state by communicating with the power state control registers 140. The power state control registers 140 in conjunction with the BIOS 150 will cause the host resources, e.g., hardware devices such as disk, CD, or DVD drives to enter a particular power management state. However, unlike fully ACPI compliant systems, the power state control registers 140 in conjunction with the BIOS 150 will only selectively comply with the requests of the host OS 140. In some instances, the hardware devices are not placed into a power management state as directed by the OS and instead are left in an operational state. However, the host OS is not informed of this non-compliance and, in fact, the active states of the hardware devices are hidden from the host OS.

More specifically, a computer system (or more appropriately, its operating system) is often implemented with some form of power management policy, e.g., in accordance with ACPI or other power management standards. The purpose of these power management standards is to unify power management in the operating system of the computer, thereby allowing inexpensive power managed hardware to support very elaborate power management policies. For example, ACPI specifies a plurality of global states (Gx states, i.e., G0: Working; G1: Sleeping; G2: Soft Off and G3: Mechanical Off), a plurality of sleeping states (Sx states) and a plurality of processor power states (Cx states). In brief, global states apply to the entire system and are visible to the user, whereas sleeping states are types of sleeping states within the global state, G1. In brief, the Sx states are defined in the ACPI as follows:

S1 Sleeping State (Standby): The S1 sleeping state is a low wake latency sleeping state. In this state, no system context is lost (CPU or chip set) and hardware maintains all system context.

S2 Sleeping State: The S2 sleeping state is a low wake latency sleeping state. This state is similar to the S1 sleeping state except that the CPU and system cache context is lost (the OS is responsible for maintaining the caches and CPU context). Control starts from the processor's reset vector after the wake event.

S3 Sleeping State (Suspend to RAM): The S3 sleeping state is a low wake latency sleeping state where all system context is lost except system memory. CPU, cache, and chip set context are lost in this state. Hardware maintains memory context and restores some CPU and L2 configuration context. Control starts from the processor's reset vector after the wake event.

S4 Sleeping State (Suspend to Disk): The S4 sleeping state is the lowest power, longest wake latency sleeping state supported by ACPI. In order to reduce power to a minimum, it is assumed that the hardware platform has powered off all devices. Platform context is maintained.

S5 Soft Off State: The S5 state is similar to the S4 state except that the OS does not save any context. The system is in the "soft" off state and requires a complete boot when it wakes. Software uses a different state value to distinguish between the S5 state and the S4 state to allow for initial boot operations within the BIOS to distinguish whether or not the boot is going to wake from a saved memory image.

Processor power states are processor power consumption and thermal management states within the global working state, G0. In brief, the Cx states are defined in the ACPI as follows:

C0 Processor Power State: While the processor is in this state, it executes instructions.

C1 Processor Power State: This processor power state has the lowest latency. The hardware latency in this state must be low enough that the operating software does not consider the latency aspect of the state when deciding whether to use it. Aside from putting the processor in a non-executing power state, this state has no other software-visible effects.

C2 Processor Power State: The C2 state offers improved power savings over the C1 state. The worst-case hardware latency for this state is provided via the ACPI system firmware and the operating software can use this information to determine when the C1 state should be used instead of the C2 state. Aside from putting the processor in a non-executing power state, this state has no other software-visible effects.

C3 Processor Power State: The C3 state offers improved power savings over the C1 and C2 states. The worst-case hardware latency for this state is provided via the ACPI system firmware and the operating software can use this information to determine when the C2 state should be used instead of the C3 state. While in the C3 state, the processor's caches maintain state but ignore any snoops. The operating software is responsible for ensuring that the caches maintain coherency.

The definitions of the Gx, Sx and Cx states are further defined in greater detail in the ACPI standard, which is herein incorporated by reference.

The different sleeping states as defined in the ACPI provide different degrees of power savings and associated latency in reviving the system. For example, the time necessary to have the system awaken may range from over one minute (e.g., S5 with the greatest amount of power savings) to a few seconds (e.g., S1 with the least amount of power savings). More importantly, when the system is in a sleep state, its resources are inaccessible without first reviving the computer system, i.e., communicating with the OS of the computer system 100. Thus, there is a dichotomy between the need to save power and the need to access the resources of the host computer without the associated latency penalty.

To address this dichotomy, the present invention provides a decoupled power management approach, where the operating system of the host computer is deceived into believing that its power saving policies have been implemented. Another perspective of the present invention is that the hardware states are intentionally hidden from the host operating system, in direct contrast to the ACPI specification that promotes operating system-directed configuration and power management. Namely, when the host operating system directs the system into one of the predefined sleeping states as defined by the ACPI standard, the system translates that request in accordance with the instructions stored within the present power state control registers 140. In some instances, the operating system's power management requests are followed, whereas in other instances, the operating system's power management requests are ignored in part or in whole. The exact translation of the operating system's power management requests into alternate power management states are described below with reference to TABLE 1.

TABLE 1

| Register Name | OS's Requested State | State Description | Actual State Implemented |
|---|---|---|---|
| MCP_APCI_C2_CTL | C2 | Stop Clock - Cache Snoopable | C2 |
| MCP_APCI_C3_CTL | C3 | CPU Sleep - Cache not - Snoopable | C2 |
| MCP_APCI_C4_CTL | C4 or VID/FID | CPU Voltage/ Frequency Change | C2 or C2 with voltage or frequency change |
| MCP_APCI_S1_CTL | S1 | System Standby (STBY) | S1 |
| MCP_APCI_S3_CTL | S3 | System Suspend to RAM (STR) | S1 |
| MCP_APCI_S4_CTL | S4 | System Suspend to Disk (STD) | S1 |
| MCP_APCI_S5_CTL | S5 | System Suspend/ Soft Off (SOFF) | S5 |
| MCP_APCI_xx_CTL | System Specific | System Specific | System Specific |

In one embodiment of the present invention, eight (8) power state control registers 140 are deployed. These eight 32-bit power state control registers control how each system power state is executed. The BIOS 150 can modify these as needed, but at a minimum, the BIOS will set up these registers whenever the computer system powers on from a mechanical power off. Table 1 labels these eight registers as (MCP_ACPI_xx_CTL). For each power state control register, Table 1 provides an operating system requested state (e.g., processor power state Cx or a sleeping state Sx), a state description, and the actual state that is implemented by the present invention.

It should be noted that not all the processor power states (e.g., C0 and C1) or sleeping states (e.g., S2) are represented in Table 1, because no power saving actions are taken for these states. In fact, those skilled in the art will realize that although the present invention discloses the deployment of eight power state control registers, any number of power state control registers can be deployed to address any number of power management states necessary to meet the requirement of a particular implementation.

In row one of Table 1, the operating system's requested state is C2, where the clock is stopped and the cache is still snoopable. Responsive to this OS request, the present invention complies and sets processor power state to C2.

In row two of Table 1, the operating system's requested state is C3, where the CPU is in a sleep mode and the cache is not snoopable. Responsive to this OS request, the present invention does not comply and sets the processor power state to C2 instead.

In row three of Table 1, the operating system's requested state is C4 or VID/FID, where the CPU may request a voltage/frequency change. Responsive to this OS request, the present invention does not comply and sets the processor power state to C2 instead. Alternatively, the present invention may comply in part, e.g., setting the processor power state to C2, but allowing the voltage/frequency change to be effected.

In row four of Table 1, the operating system's requested state is S1, where the system is in standby. Responsive to this OS request, the present invention complies and sets sleeping state to S1.

In row five of Table 1, the operating system's requested state is S3, where the system is suspended to RAM, i.e., where the CPU saves all its states to RAM memory. Responsive to this OS request, the present invention does not comply and sets the sleeping state to S1 instead.

In row six of Table 1, the operating system's requested state is S3, where the system is suspended to disk, i.e., where the CPU saves all its states to a disk. Responsive to this OS request, the present invention does not comply and sets sleeping state to S1 instead.

In row seven of Table 1, the operating system's requested state is S5, where the system is in soft off. Responsive to this OS request, the present invention complies and sets sleeping state to S5.

In row eight of Table 1, the operating system's requested state is a system specific state. Namely, the eighth register is implemented as an extra or optional register to address a system specific state or to allow state expansion.

These power state control registers 140, in effect, drive a power down state machine. Namely, the state machine based off the register for each state, will decide what is to be done in accordance with instructions stored within each register. The information stored within each 32-bit register is disclosed in Table 2 below.

TABLE 2

| Bit | Description |
|---|---|
| 31 | Reserved |
| 30–28 | SMAF. System Management Action Field. |
| 27 | PME_WAK.Wake on a PME# event. 0 = Do not wake the system. 1 = Wake the system. |
| 26 | SMI_WAK. Wake on a SMI#event. 0 = Do not wake the system. 1 = Wake the system. |
| 25 | IRQ_WAK. Wake on an Interrupt event. 0= Do not wake the system. 1= Wake the system. |
| 24 | ARB_REQ_WAK. Wake on a Bus Master Request event. 0 = Do not wake the system. 1 = Wake the system. |
| 23–22 | RSM_DLY. The system must remain in this state for a minimum period regardless of an event. 00 = No minimum period. 01 = Remain in state a minimum of 250 mS. 01 = Remain in state a minimum of 500 mS. 01 = Remain in state a minimum of 1000 mS. |
| 21–19 | SLP_S5_DLY. This controls the delay from PCI_RST# activation to SLP_S5# activation. SLP_S5# is typically used to turn off the memory power. Note: SLP_S5 and SLP_S3 can both be programmed with independent delays from PCI_RST#. This allows either SLP_S5# or SLP_S3# to assert first, On deassertion, the delay for SLP_S5# is still set by the SLP_S3_DLY, and SLP_S3# and SLP_S5# will deassert simultaneously. See the Activation Delay table below. |
| 18–16 | SLP_S3_DLY. This controls the delay from PCI_RST# activation to SLP_S3# activation. SLP_S3# is typically used to turn off the main power supply rails. See the Activation Delay table below. |
| 15–13 | PCIRST_DLY. This controls the delay from SLP_S1# activation to PCI_RST# activation. PCI_RST# is used to reset all the system logic. See the PCI_RST# Activation Delay tbl. |
| 12–10 | SLP_S1_DLY. This controls the delay from LDT_STP# activation to SLP_S1# activation. SLP_S1# is typically used to power an LED. See the Activation Delay table below. |
| 9 | CPUSLP_EN. This controls CPU SLP# activation. CPU_SLP# activation, if enabled, is simultaneous to LDT_STP# activation. CPU_SLP# is typically used to put the CPU into a lower power state than possible with STPCLK#. |
| 8–6 | LDTSTP_DLY. This controls the delay from the Stop Grant Special cycle (the CPU's response to STPCLK# assertion) activation to LDT_STP# activation. LDT_STP# is used to disconnect the LDT Bus. See the Activation Delay table below. |
| 5–3 | STPCLK_DLY. This controls the delay from the power management command to the activation to STPCLK# activation. STPCLK# is used to put the CPU in a Stop Grant state. See the Activation Delay table below. |
| 2 | ARB_OVR. Arbiter Disable Override is used to allow devices to still access system memory for non-coherent accesses even though the Arbiter is Disabled. 0 = MCP_ACPI_PM2_CNT[ARB_DIS] is valid. 1 = MCP_ACPI_PM2_CNT[ARB_DIS] is forced to allow bus masters. |
| 1 | SMI. SMI# enable. This determines if when this state is entered a SMI# is caused. 0 = Do not cause a SMI#. 1 = Cause an SMI# and perform no function that has been enabled until this bit is cleared and another event is observed to enter this state. This bit is used by the BIOS to cause a SMI# on any particular state. This allows the BIOS to always be called before the system does a state transition. This bit must be cleared by BIOS and another event triggered to enter a state. |
| 0 | ST_EN. State Enable. This bit must be set for the rest of the bits in this register to be executed, except for the SMI bit which is operated on regardless. The SMI bit will prohibit any operation regardless of the state of this bit. 0 = Do nothing. 1 = Execute the state transitions as specified by this register, if SMI = 0. |

Bit 31 of each power state control register is reserved. The use of this particular bit can be implemented at a later time pursuant to a specific application.

Bits 30-28 define a system management action field (SMAF). This field is used to optionally inform the CPU as to what actions are currently being taken.

Bit 27 defines a PME_WAK field. This field is used to define whether the system will wake from a power management event (PME) event or PME input. PMEs are use in Sx states to signal that the system should be woken up. In one embodiment, the PME_WAK field is set to "1" for Sx states and "0" for the Cx states.

Bit 26 defines a SMI_WAK field. This field is used to define whether the system will wake from a system management interrupt (SMI) event. SMIs are used whenever it is desirable to give control to the SMM routine and take control away from the OS. This field is used to wake the CPU for an alternate function that is not defined in the ACPI standard. For example, one may use SMI# wake event as an alternative to PMEs.

Bit 25 defines an IRQ_WAK field. This field is used to define whether the system will wake from an interrupt event. Namely, this field is used to wake the CPU for an alternate function that is not defined in the ACPI standard, e.g., waking the CPU with an interrupt.

Bit 24 defines a ARB_REQ_WAK field. This field is used to define whether the system will wake from a Bus Master Request event. A Bus Master Request event is when any bus master that is not the CPU, wants to use the bus. The ACPI standard uses this in C3 if it has not flushed the cache to system memory. This wakes the CPU up so that it's cache can be snooped. Namely, this field is used to wake the CPU for an alternate function that is not defined in the ACPI standard.

Bits 23-22 define a resume delay (RSM_DLY) field. This field is implemented to define a period of time that must elapse before the CPU is awaken, i.e., not waking the CPU too early. This field can be used to address effects caused by implementing power saving operations, e.g., lock up may occur in a power supply if power is switched off and on too quickly and so on.

Bits 21-19 define a SLP_S5_DLY field that controls power supply rails. Specifically, this field controls the delay from a PCI reset (PCI_RST#) activation to SLP_S5# activation, where SLP_S5# is typically employed to turn off the main memory power.

Bits 18-16 define a SLP_S3_DLY field that controls power supply rails. Specifically, this field controls the delay from a PCI reset (PCI_RST#) activation to SLP_S3# activation, where SLP_S3# is typically employed to turn off the main power supply rails, i.e., turning the power off to the CPU.

Bits 15-13 define a PCIRST_DLY field that controls power supply rails. Specifically, this field controls the delay from a SLP_S3# activation to a PCI reset (PCI_RST#) activation, where PCI_RST# is employed to reset all the system logic. Namely, this field defines whether to put the system into a reset.

Bits 12-10 define a SLP_S1_DLY field that controls power supply rails. Specifically, this field controls the delay from a LDT_STP# activation to SLP_S1# activation, where SLP_S1# is typically employed to power an LED that indicates whether the motherboard is asleep or not. The LDT_STP# is a pin that directs whether the CPU bus is to be disconnected or not. LDT is also know as the Hyper-Transport Bus. It is a point-to-point bus designed by AMD. The LDT_STP# pin causes this bus protocol to "stop".

Bit 9 defines a CPUSLP_EN field that controls the CPU SLP# activation. It should be noted that the ACPI defines a sleeping/wake logic that is controlled via two bit fields: Sleep Enable (SLP_EN) and Sleep Type (SLP_TYPx). The type of sleep state desired is programmed into the SLP_TYPx field and upon assertion of the SLP_EN the hardware will sequence the system into the defined sleeping state.

Bits 8-6 define a LDTSTP_DLY field that controls the delay from the Stop Grant Special cycle (the CPU's response to STPCLK# assertion) activation to LDT_STP# activation. LDT_STP# is used to disconnect the LDT Bus.

Bits 5-3 define a STPCLK_DLY field that controls the delay from the power management command to the activation to STPCLK# activation, where STPCLK# is used to put the CPU in a Stop Grant state.

Bit 2 defines an arbiter override (ARB_OVR) field that is used to allow devices to still access system memory for non-coherent accesses even though the Arbiter is Disabled. Specifically, a standard PM2_CNT_BLK register block in accordance with the ACPI standard contains a single bit for the arbiter disable function. Namely, this bit is implemented to override that bit.

Bit 1 defines a system management interrupt (SMI) enable field. This field determines whether a SMI# is caused.

Bit 0 defines a state enable (ST_EN) field. This bit must be set for the rest of the bits in this register to be executed, except for the SMI bit which is operated on regardless.

It should be noted that the fields as defined in Table 2 for each power state control register 140 are only illustrative in a particular embodiment. Those skilled in the art will realize that these fields can be implemented in part (i.e., implementing only a subset of the above fields), in different orders, in different sizes or using different parameters than those disclosed above.

Furthermore, many of the above fields (including various parameters) in each power state control register 140 are implemented in anticipation of being deployed in an ACPI compliant system. However, those skilled in the art will realize that the present invention can be adapted so that it can be deployed in a system that may comply with other power management standards.

Additionally, although the present invention is implemented using state abstraction registers as disclosed above, the present invention is not so limited. Namely, the abstraction can be stored in fixed logic or it can even be read from a ROM when needed. The main approach of the present Invention is to abstract the standard registers to another system or device defined state.

One advantage of the present invention is that the power state control registers 140 can be deployed in a system where the host OS presumes that a particular power management standard, e.g., ACPI, is being followed. In this manner, an alternate power management scheme can be implemented using the present invention without the need to modify the host OS. This is a significant advantage because a computing system manufacturer may desire an alternate power management scheme, while still being able to use standard operating systems without having to address incompatibility issues.

Table 3a discloses specific standard settings for various bits of the power state control registers in accordance with processor power states (Cx) and sleeping states (Sx). In other words, these settings would be ACPI compliant.

TABLE 3a

| Bits | C2 | C3 | S1 | S3 | S4 | S5 | Field |
|---|---|---|---|---|---|---|---|
| 31 | 0 | 0 | 0 | 0 | 0 | 0 | Reserved |
| 30:28 | 000 | 000 | 000 | 000 | 000 | 000 | SMAF. |
| 27 | 0 | 0 | 1 | 1 | 1 | 1 | PME_WAK. |
| 26 | 0 | 0 | 0 | 0 | 0 | 0 | SMI_WAK. |
| 25 | 1 | 1 | 0 | 0 | 0 | 0 | IRQ_WAK. |
| 24 | 0 | 1 | 0 | 0 | 0 | 0 | ARB_REQ_WAK. |
| 23:22 | 00 | 00 | 00 | 00 | 00 | 00 | RSM_DLY. |
| 21:19 | 000 | 000 | 000 | 000 | 001 | 001 | SLP_S5_DLY. |
| 18:16 | 000 | 000 | 000 | 001 | 001 | 001 | SLP_S3_DLY. |
| 15:13 | 000 | 000 | 000 | 001 | 001 | 001 | PCIRST_DLY. |
| 12:10 | 000 | 000 | 001 | 001 | 001 | 001 | SLP_S1_DLY. |
| 9 | 000 | 001 | 001 | 001 | 001 | 001 | CPUSLP_EN. |
| 8:6 | 000 | 001 | 001 | 001 | 001 | 001 | LDTSTP_DLY. |
| 5:3 | 001 | 001 | 001 | 001 | 001 | 001 | STPCLK_DLY. |
| 2 | 0 | 0 | 0 | 0 | 0 | 0 | ARB_OVR. |
| 1 | 0 | 0 | 0 | 0 | 0 | 0 | SMI. |
| 0 | 1 | 1 | 1 | 1 | 1 | 1 | ST_EN. |

In contrast, Table 3b discloses modified settings for various bits of the power state control registers in accordance with processor power states (Cx) and sleeping states (Sx). In other words, these modified settings would cause the actual implemented states as shown above in Table 1.

TABLE 3b

| Bits | C2 | C3 | S1 | S3 | S4 | S5 | Field |
|---|---|---|---|---|---|---|---|
| 31 | 0 | 0 | 0 | 0 | 0 | 0 | Reserved |
| 30:28 | 000 | 000 | 000 | 000 | 000 | 000 | SMAF. |
| 27 | 0 | 0 | 1 | 1 | 1 | 1 | PME_WAK. |
| 26 | 1 | 1 | 1 | 1 | 1 | 0 | SMI_WAK. |
| 25 | 1 | 1 | 0 | 0 | 0 | 0 | IRQ_WAK. |
| 24 | 0 | 0 | 0 | 0 | 0 | 0 | ARB_REQ_WAK. |
| 23:22 | 00 | 00 | 00 | 00 | 00 | 00 | RSM_DLY. |
| 21:19 | 000 | 000 | 000 | 000 | 000 | 001 | SLP_S5_DLY. |
| 18:16 | 000 | 000 | 000 | 000 | 000 | 001 | SLP_S3_DLY. |
| 15:13 | 000 | 000 | 000 | 000 | 000 | 001 | PCIRST_DLY. |
| 12:10 | 000 | 000 | 001 | 001 | 001 | 001 | SLP_S1_DLY. |
| 9 | 000 | 000 | 001 | 001 | 001 | 001 | CPUSLP_EN. |
| 8:6 | 000 | 000 | 000 | 000 | 000 | 001 | LDTSTP_DLY. |
| 5:3 | 001 | 001 | 001 | 001 | 001 | 001 | STPCLK_DLY. |
| 2 | 0 | 0 | 1 | 1 | 1 | 0 | ARB_OVR. |
| 1 | 0 | 0 | 1 | 1 | 1 | 0 | SMI. |
| 0 | 1 | 1 | 1 | 1 | 1 | 1 | ST_EN. |

Finally, Tables 4 and 5 are illustrative delay tables. Although the present invention discloses an activation delay table 4 and PCI_RST activation delay table 5 with a plurality of specific delay values, it should be noted that other delay values can be implemented to address a particular application.

TABLE 4

| Delay Value | Activation Delay from Previous Signal |
| --- | --- |
| 000 | Signal is not activated. |
| 001 | Wait 16 Clocks from previous signal (14.318 MHz clocks) |
| 010 | Wait 32 Clocks from previous signal (14.318 MHz clocks) |
| 011 | Wait 64 Clocks from previous signal (14.318 MHz clocks) |
| 100 | Wait 128 Clocks from previous signal (14.318 MHz clocks) |
| 101 | Wait 256 Clocks from previous signal (14.318 MHz clocks) |
| 110 | Wait 512 Clocks from previous signal (14.318 MHz clocks) |
| 111 | Wait 1024 Clocks from previous signal (14.318 MHz clocks) |

TABLE 5

| Delay Value | Activation Delay from Previous Signal |
| --- | --- |
| 000 | Signal is not activated. |
| 001 | Wait 1 mS from the previous signal |
| 010 | Wait 2 mS from the previous signal |
| 011 | Wait 4 mS from the previous signal |
| 100 | Wait 8 mS from the previous signal |
| 101 | Wait 16 mS from the previous signal |
| 110 | Wait 32 mS from the previous signal |
| 111 | Wait 64 mS from the previous signal |

Although various embodiments which incorporate the teachings of the present invention have been shown and described in detail herein, those skilled in the art can readily devise many other varied embodiments that still incorporate these teachings. In the claims, elements of method claims are listed in a particular order, but no order for practicing of the invention is implied, even if elements of the claims are numerically or alphabetically enumerated.

What is claimed is:

1. Method for managing power states of a plurality of host resources of a host computer having a host operating system (OS) said method comprising the steps of:

receiving a command from the host operating system to set a first power state for at least one of said host resources;

consulting at least one power state abstraction device to translate said first power state to a second power state for said at least one of said host resource, wherein said first and second power states are different; and causing said at least one of said host resources to be set to said second power state, different from said command from the host operating system.

2. The method of claim 1, further comprising the step of:

causing said at least one of said host resources to be set to said second power state, contrary to said command from the host operating system.

3. The method of claim 1, wherein if said first power state is S4 in accordance with an Advanced Configuration and Power Interface (ACPI) specification, then said second power state is S1 in accordance with said Advance Configuration and Power Interface (ACPI) specification.

4. The method of claim 1, wherein if said first power state is S3 in accordance with an Advanced Configuration and Power Interface (ACPI) specification, then said second power state is S1 in accordance with said Advance Configuration and Power Interface (ACPI) specification.

5. The method of claim 1, wherein if said first power state is C4 in accordance with an Advanced Configuration and Power Interface (ACPI) specification then said second power state is C2 in accordance with an Advanced Configuration and Power Interface (ACPI) specification.

6. The method of claim 1, wherein if said first power state is C3 in accordance with an Advanced Configuration and Power Interface (ACPI) specification, then said second power state is C2 in accordance with said Advanced Configuration and Power Interface (ACPI) specification.

7. The method of claim 2, wherein said causing step causes said at least one of said host resources to be set to said second power sate, where said second power state is only partially contrary to said command from the host operating system.

8. The method of claim 1, wherein said at least one of said host resources is a storage device.

9. The method of claim 8, wherein said storage device is a disk drive.

10. The method of claim 8, wherein said storage device is a random access memory (RAM).

11. The method of claim 1, wherein said at least one of said host resources is a compact disk (CD) player.

12. The method of claim 1, wherein said at least one of said host resources is a digital videodisk (DVD) player.

13. The method of claim 1, wherein said first power state is set in a first power state control register, at least one power state abstraction device comprises a second state control register.

14. A method as claimed in claim 1 wherein the consulting step is under control of a BIOS to provide power management of the host resource decoupled from the OS.

15. Apparatus for managing power states of plurality of host resources of a host computer having a host operating system (OS) said apparatus comprising:

means for receiving a command from the host operating system to set a first power state for at least one of said host resources;

at least one power state abstraction device; and means comprising a BIOS for controlling said at least one host resource and for consulting said at least one power state abstraction device to translate said first power state to a second power state for said at least one of said host resources said consulting being decoupled from the OS, wherein said first and second power states are different.

16. The apparatus of claim 15, further comprising:

means for causing said at least one of said host resources to be set to said second power state, contrary to said command from the host operating system.

17. The apparatus of claim 15, wherein if said first power state is S4 in accordance with an Advanced Configuration and Power Interface (ACPI) specification, then said second power state is S1 in accordance with said Advanced Configuration and Power Interface (ACPI) specification.

18. The apparatus of claim 15, wherein if said first power state is S3 in accordance with an Advanced Configuration and Power Interface (ACPI) specification, then said second power state is S1 in accordance with said Advanced Configuration and Power Interface (ACPI) specification.

19. The apparatus of claim 15, wherein if said first power state is C4 in accordance with an Advanced Configuration and Power Interface (ACPI) specification then said second power state is C2 in accordance with an Advanced Configuration and Power Interface (ACPI) specification.

20. The apparatus of claim 15, wherein if said first power state is C3 in accordance with an Advanced Configuration and Power Interface (ACPI) specification, then said second power state is C2 in accordance with said Advanced Configuration and Power Interface (ACPI) specification.

21. The apparatus of claim 16, wherein said second power state is only partially contrary to said command from the host operating system.

22. The apparatus of claim 15, wherein said at least one of said host resources is a storage device.

23. The apparatus of claim 22, wherein said storage device is a disk drive.

24. The apparatus of claim 22, wherein said storage device is a random access memory (RAM).

25. The apparatus of claim 15, wherein said at least one of said host resources is a compact disk (CD) player.

26. The apparatus of claim 15, wherein said at least one of said host resources is a digital videodisk (DVD) player.

27. The apparatus of claim 15, wherein said means for receiving a command is a first power state control register and said at least one power state abstraction device is a second power state control register.

28. Apparatus for managing power states of a plurality of host resources of a host computer having a host operating system (OS), said apparatus comprising:

at least one power state abstraction device; and

BIOS for receiving a command from the host operating system to set a first power state for at least one of said host resources and for consulting said at least one power state abstraction device to translate said first power state to second power state for said at least one of said host resources, wherein said first said second power states are different.

29. The apparatus of claim 28, wherein said BIOS causes said at least one of said host resources to be set to said second power state.

30. The apparatus of claim 28, wherein if said first power state is S4 in accordance with an Advanced Configuration and Power Interface (ACPI) specification, then said second power state is S1 in accordance with said Advanced Configuration and Power Interface (ACPI) specification.

31. The apparatus of claim 28, wherein if said first power state is S3 in accordance with an Advanced Configuration and Power Interface (ACPI) specification, then said second power state is S1 in accordance with said Advanced Configuration and Power Interface (ACPI) specification.

32. The apparatus of claim 28, wherein if said first power state is C4 in accordance with an Advanced Configuration and Power Interface (ACPI) specification then said second power state is C2 in accordance with an Advanced Configuration and Power Interface (ACPI) specification.

33. The apparatus of claim 28, wherein if said first power state is C3 in accordance with an Advanced Configuration and Power Interface (ACPI) specification, then said second power state is C2 in accordance with said Advanced Configuration and Power Interface (ACPI) specification.

34. The apparatus of claim 29, wherein said second power state is only partially contrary to said command from the host operating system.

35. The apparatus of claim 28, wherein said at least one of said host resources is a storage device.

36. The apparatus of claim 35, wherein said storage device is a disk drive.

37. The apparatus of claim 35, wherein said storage device is a random access memory (RAM).

38. The apparatus of claim 28, wherein said at least one of said host resources is a compact disk (CD) player.

39. The apparatus of claim 28, wherein said at least one of said host resources is a digital videodisk (DVD) player.

40. The apparatus of claim 28, wherein said at least one power state abstraction device is a register.

41. A computer-readable medium having stored thereon a plurality of instructions or control bits, the plurality of instructions including instructions which, when executed by a processor or control bits accepted by a hardware device, cause the processor or the hardware device to perform steps managing power states of a plurality of host resources comprising:

receiving a command from the host operating system (OS) to set a first power state for at least one of said host resources;

consulting at least one power state abstraction device to translate said first power state to a second power state for said at least one of said host resources, wherein said first and second power states are different; and causing said at least one of said host resources to be set to said second power state said causing being decoupled from the OS.

42. The computer-readable medium of claim 41, further comprising the step of:

causing said at least one of said host resources to be set to said second power state, contrary to said command from the host operating system.

43. The computer-readable medium of claim 41, wherein if said first power state is S4 in accordance with an Advanced Configuration and Power Interface (ACPI) specification, then said second power state is S1 in accordance with said Advanced Configuration and Power Interface (ACPI) specification.

44. The computer-readable medium of claim 41, wherein if said first power state is S3 in accordance with an Advanced Configuration and Power Interface (ACPI) specification, then said second power state is S1 in accordance with said Advanced Configuration and Power Interface (ACPI) specification.

45. The computer-readable medium of claim 41, wherein if said first power state is C4 in accordance with an Advanced Configuration and Power Interface (ACPI) specification then said second power state is C2 in accordance with an Advanced Configuration and Power Interface (ACPI) specification.

46. The computer-readable medium of claim 41, wherein if said first power state is C3 in accordance with an Advanced Configuration and Power Interface (ACPI) specification, then said second power state is C2 in accordance with said Advanced Configuration and Power Interface (ACPI) specification.

47. The computer-readable medium of claim 41, wherein said causing step causes said at least one of said host resources to be set to said second power state, where said second power state is contrary to said command from the host operating system.

48. The computer-readable medium of claim 41 wherein said at least one of said host resources is a storage device.

* * * * *

UNITED STATES PATENT AND TRADEMARK OFFICE
CERTIFICATE OF CORRECTION

PATENT NO. : 6,848,057 B2
DATED : January 25, 2005
INVENTOR(S) : Gary D. Hicok

It is certified that error appears in the above-identified patent and that said Letters Patent is hereby corrected as shown below:

Column 11,
Line 43, replace "resource" with -- resources --.

Column 12,
Line 27, add -- a -- between "of" and "plurality".

Column 13,
Line 23, add -- a -- between "to" and "second".
Line 24, replace "said" with -- and --. (second occurrence)

Signed and Sealed this

Twenty-ninth Day of November, 2005

JON W. DUDAS
*Director of the United States Patent and Trademark Office*